Dec. 23, 1969  J. K. FROST  3,485,236
BIOPSY SPECIMEN COLLECTING AND SPREADING DEVICE
Filed Dec. 9, 1965  2 Sheets-Sheet 1
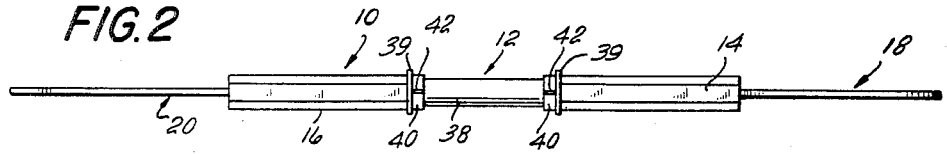
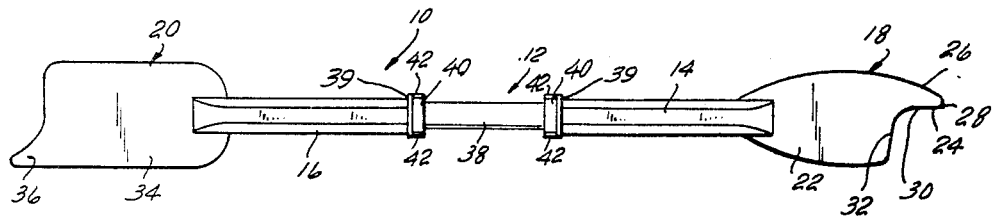
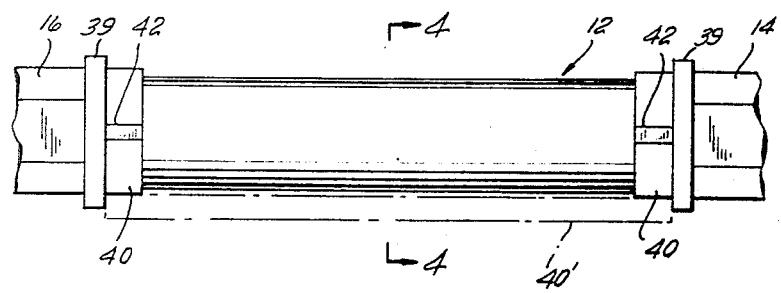
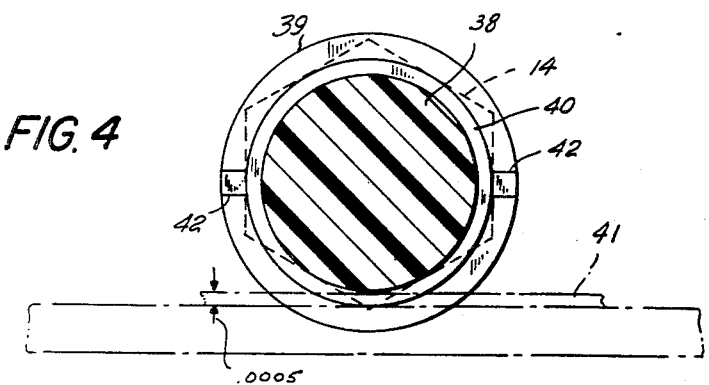
INVENTOR
JOHN K. FROST.
BY
ATTORNEYS Dec. 23, 1969   J. K. FROST   3,485,236
BIOPSY SPECIMEN COLLECTING AND SPREADING DEVICE
Filed Dec. 9, 1965   2 Sheets-Sheet 2

INVENTOR
JOHN K. FROST
BY
Kane, Dalsimer & Kane
ATTORNEYS

United States Patent Office 3,485,236
Patented Dec. 23, 1969

3,485,236
BIOPSY SPECIMEN COLLECTING AND
SPREADING DEVICE
John K. Frost, Lutherville, Md., assignor to Becton Dickinson and Company, East Rutherford, N.J., a corporation of New Jersey
Filed Dec. 9, 1965, Ser. No. 512,748
Int. Cl. A61b 10/00, 17/22
U.S. Cl. 128—2                      8 Claims

ABSTRACT OF THE DISCLOSURE

A biopsy specimen collecting and spreading device for collecting test specimen which comprises a relatively elongated body portion having means formed thereon for spreading a test specimen along a relatively flat surface. Scraping and collecting head portions are formed integrally with the body portion and disposed at each end thereof with each head being disposed in a plane along the longitudinal axis of the body portion.

---

This patent relates to an improved scraping device for collecting test specimens from various parts of the human body. It has particular application to all plastic scrapers for collecting cells from the cervix and embraces in combination therewith, a unique integral spreading device for immediate application of the scrapings to a supporting surface such as a test slide.

The obtaining of cytology or test specimens from various parts of the human body for the detection of certain diseases has assumed increasing importance with the advent of improved techniques for the determination of various diseases. It has assumed especial importance in the detection of cancer of the uterus and cervix. The present application will be devoted primarily to a cervical scraping device embodying an integral one piece construction. It should be understood that my invention contemplates the utilization of scraping devices for other areas of the body. Thus, it is also possible to obtain scrapings from other areas of the body, these areas including the skin, throat, vulva and tongue.

With respect to the detection of cervical cancer, present methods and techniques have made mass testing possible for both pregant and non-pregnant women. This program of mass testing, however, has not been free of problems. For it to be a success, a woman must either come to the doctor to have the test made or perform the test herself. In addition, the instrument used for obtaining the test sample or smear must be economically manufactured. It must be sufficiently resilient and not subject to breakage as well as easily manipulable. Thus, if the test is to be performed by the woman at home, the instrument must be one that she can easily handle without fear of breakage.

A major problem after the obtaining of the smear presents itself in the immediate application of the specimen to a test slide and the prompt spreading and affixation of the specimen thereto; otherwise, it is not possible to obtain high quality slides. The problem heretofore was that high quality slides have not been able to be produced even by the doctor. In many instances, the laboratory technician could not conclude the test accurately with the samples given to him and accordingly, would have to return the slide to the doctor or the patient for the taking of an additional test specimen. An additional consideration in the making of an all plastic scraper is that the scraper portion thereof must be wettable.

It is a prime object of this invention to provide an improved scraping device for collecting test specimens which may be combined with a unique spreading device formed integrally therewith for applying and spreading the specimen immediately to a test slide in one operation whereby superior test specimens are maintainable so that optimum cellular and test samplings are assured for subsequent testing.

It is a further object to provide a scraping device that has superior strength and resiliency, thus eliminating substantially the chances of breakage and injury to the patient and a device in which the scraper and specimen collecting portions thereof have been made wettable so as to obtain maximum test specimens adherence thereto.

A scraping device, in accordance with the teachings of this invention, comprises: a rod-shaped body having at least one scraping and specimen collecting head and at least one manipulating portion whereby the scraping and specimen collecting head may be effectively manipulated. Of particular importance is the additional provision of a spreading portion on the rod-shaped body for permitting immediate spreading of the collected specimen on a test slide. In this manner, accurate test slides are achieved to permit assured detection of any irregularities present in the test specimen.

With these and other objects in mind, reference is had to the attached drawings indicating various embodiments of the invention and the manner of using the same in which:

FIG. 1 is a side elevation of the preferred form of cervical scraper embodying our invention;

FIG. 2 is a top end view of the scraper shown in FIG. 1;

FIG. 3 is an enlarged fragmentary view of the spreading portion of the cervical scraper shown in use on a test slide;

FIG. 4 is a cross-sectional view of the spreading portion in the direction of the arrows on line 4—4 of FIG. 3;

Figure 5:
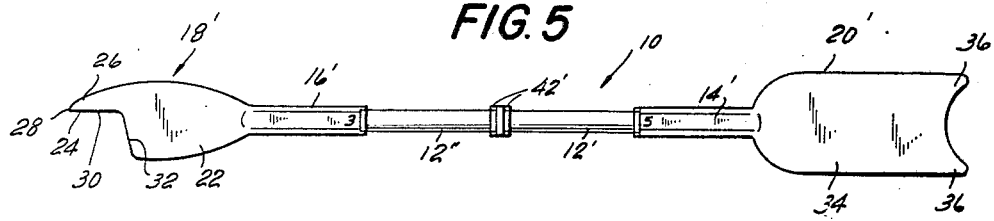
FIG. 5 is a view similar to FIG. 1 showing another form of our cervical scraper.

Referring to the form of cervical scraper, as shown in FIGS. 1 and 2, the rod-like body is shown at 10. It has a spreading portion 12 as well as manipulating portions 14 and 16. Extending from one end of the body 10 is provided a scraping and specimen collecting head 18. Extending from the opposite end of said body is an additional scraping and specimen collecting head 20. The cervical scraper itself may be made of any suitable plastic material which is inert and unaffected by the body fluids, antiseptics, anesthetics and other materials with which it may be used and with which it comes in contact. The material should also be such that the device is relatively rigid, i.e. it should be sufficiently rigid so as to serve in its scraping function to obtain maximum test specimens. However, it should be sufficiently resilient so that it will not break during the scraping action. For this purpose, we have found that plastic materials such as polyethylene, polypropylene and polystyrene, serve very satisfactorily.

Formed integrally and extending from each end of the cervical scraper are the scraping and specimen collecting heads indicated by the reference numbers 18 and 20. Particular reference is had to the scraping and specimen collecting head 18 of FIG. 1 which comprises a body portion 22 having a tip 24 projecting therefrom. One edge 26 of the tip extends contiguously with one edge of the body portion 22 to form a continuous arc terminating in a substantially arcuate point 28. The opposite edge of the tip 30 is substantially parallel with the longitudinal axis of the rod shaped body member 10 and terminates at the forward edge 32 of the body portion 22. The respective edges of both the body portion and the tip portion of the scraping and specimen collecting head serve as scraping edges therefor. The tip portion should project forwardly a sufficient distance to permit insertion thereof into the squamo-columnar-junctional circle of the cervical area. The scraping and specimen collecting head 20 provided at the opposite end of the rod-shaped body 10 comprises a relatively flat, rectangular body portion 34 having a tip 36 extending a short distance from one edge thereof. This particular configuration has utility in obtaining test specimens from the pregnant or eroded cervix.

Figure 6:
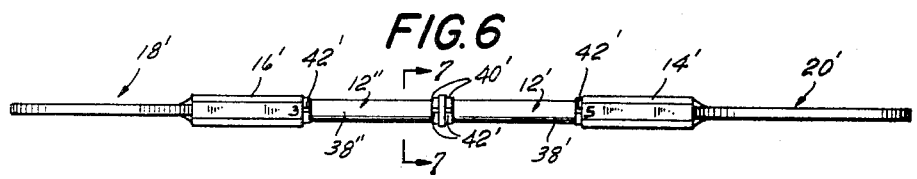
FIG. 6 is a view similar to FIG. 2 showing the form of scraper depicted in FIG. 5.

In the form of our invention shown in FIGS. 5 and 6, like parts are given similar numbers. Thus, the cervical scraper depicted in these drawings has a rod-shaped body 10' with a pair of interposed cellular spreaders 12' and 12" and a pair of manipulating zones 14' and 16'. Scraping and specimen collecting means 18' and 20' are provided at opposite ends of the rod-shaped body. The scraping and specimen collecting means 20' comprises a relatively flat rectangular body portion 34' with a substantially concave outer edge. In this form of cervical scraper, a plurality of spreaders has been provided to afford the user the desired flexibility in selecting the desired thickness of test specimen to be spread on a test slide.

It is a further feature of our invention to provide a cervical scraper made in one piece of an all plastic material having a specimen collecting portion that is capable of obtaining and retaining maximum celular material. Thus, the scraper and specimen collecting portions of our device have been made water-wettable. With current technology, any one of a number of approaches may be adapted for rendering the collecting ends water-wettable. For example, the material may be treated physically, chemically or both. Therefore, as the cervical scraper may be molded in one piece of a plastic material of the type indicated above, satisfactory results may be obtained if the surfaces of the mold throughout the configurations corresponding to the scraper and specimen collecting portions of the device are first roughened by dry-blasting the mold with silica fine sand having a roughness of about 240–270 microinches, that is utilizing silica fine sand that will pass through a screen having a mesh size between 240 and 270 microinches. The molded parts are then chemically treated as follows. First, they are cleaned. Ultrasonic techniques may be utilized for cleaning the parts in this step. Second, they are dipped in a water-wettable solution and third, the device is air-dried as by dipping or shaking. The water-wettable solution should be one that is inert to and unaffected by the materials with which the cervical scraper may come in contact, such that it will not affect the test results. We have found that a solution of acetone provides satisfactory results in that the surface of the scraping and specimen collecting head will have the desired wettability or ability to hold the scrapings obtained from the test area. Another satisfactory method for attaining the desired wettability is disclosed in U.S. Patent No. 3,097,070, Aldrich et al. granted July 9, 1963. In this patent, the agent used to achieve the desired wettability is silicon oxide.

Again referring to the cervical scraper, as shown in FIGS. 1 and 2, the rod-like body 10 is provided with a pair of manipulating portions 14 and 16 whereby the scraping and specimen collecting ends may be effectively manipulated. The manipulating portion generally is non-circular or polygonal in configuration and has been shown as having flattened or side walls. The preferred configuration can be seen in FIG. 4 in which the manipulating portion is shown as having an irregular or hexagonal cross section. The manipulating portion is in the zone adjacent one of the scraping and specimen collecting members. The purpose for the irregular or hexagonal cross section is to provide a portion of the body which can be manipulated easily by the fingers so as to rotate the device for obtaining maximum scrapings of cell tissue.

A major feature of my invention is the provision of spreading means 12 formed on the rod-shaped body of the scraper. The provision of the spreading means as hereinafter described permits the immediate spreading in one step of the collected specimen on a test slide in such a fashion that accurate test slides are obtained to permit for accurate testing of the cellular specimens thereof. The spreading means comprises a zone of reduced diameter 38 with respect to the body member 10. It has two annular ribs or shoulders 40 adjacent the opposite ends of the spreading zone that are provided a sufficient distance apart so as to permit movement of the device over a test slide, but rest thereon so that the spreading portion 38 itself is in vertical spaced relationship with the test slide.

It is desirable that a thin monocellular layer of material 41 be spread evenly on a test slide for subsequent inspection thereof. We have found that for most purposes, the layer of cervical scrapings should have a thickness of about .0005 inch. Accordingly, the difference in outside diameter between the spreading portion 38 and the annular shoulders 40 would be .005 inch. It may be desired to have more than one spreading portion on the scraper. Thus, as shown in FIG. 5 and FIG. 6, a plurality of spreaders indicated by the numerals 12' and 12" may be provided. In this instance, the diameter difference between the spreader portion and the annular shoulders may be varied so as to provide for maximum flexibility. Thus, as shown in FIG. 5 and in FIG. 6, the second spreading portion 12" has been designed to provide a specimen layer of .0003 inch on the test slide. In addition, where specimens other than cervical scrapings are desired, it may be preferable to have a layer of material of a thickness differing from that of the cervical specimens due to the viscosity of the specimen itself. In this instance, a spreader portion of varying depth would be desired. Lateral extensions 42' in FIGS. 5–7 and 42 with respect to FIGS. 1–4 may be provided to limit and thus assist in controlling the movement of the spreaders on the test slide.

Figure 7:
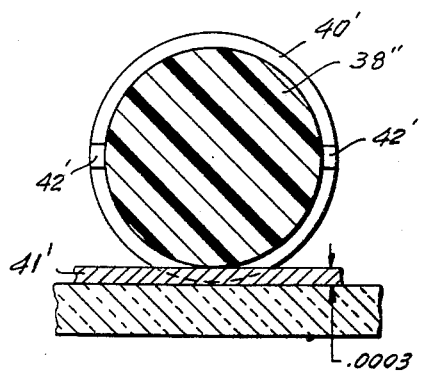
FIG. 7 is a cross-sectional view of the spreading portion in the direction of the arrows on line 7—7 of FIG. 6.

The cervical scraper embodying our invention may be used according to the following method. The scraper is inserted into the cervical canal and rotated to a complete cycle of 360°. Cellular material is scraped from the entire squamo-columnar-junctional circle. The scraper is removed and the cellular material is immediately deposited on the clear glass portion of a test slide and immediately thereafter, spread over the slide with the conveniently located spreading device of the scraper. Thus, as indicated in FIGS. 3, 4 and 7, the spreading portion of the cervical scraper is immediately placed onto a test slide so that the shoulder portions 40 rest on the end edges thereof whereupon the cellular material is spread over the slide so as to effectuate an even distribution of monocellular layer of material. It also should be noted, as shown in the drawings, that end stops 39 facilitate the proper positioning of the spreading means with respect to the test slide. Immediately after the cellular material is spread on the slide, the smear is flooded with a few drops of a fixitive. Fixitives are well known in the art. They are generally used to fix a smear to a slide so that it may be transported without fear of losing any of the test specimen. A preparation suitable for this use is manufactured by Becton, Dickinson and Company under the trade name of FIXETTE. The fixitive comprises a mixture of ethyl alcohol and polyethylene glycol. The slide is thereupon allowed to dry. If the test comes as part of a kit, a patient record form is usually supplied which it to be filled out. The slide is carefully placed in a plastic or other similar slide holder and the patient record form attached in a convenient manner. The entire unit is then mailed to the laboratory by either the doctor who performs the test or the patient, if she performs the test herself.

In the several forms of my invention, the specific shape or configuration of the scraper and cell collecting heads may be varied. These scraper portions may be designed to fit the particular body form from which specimens are to be obtained. Thus, they may be circular or rectangular, etc., in configuration. In addition, the manipulating portion or gripping portion should be long enough to be conveniently gripped for rotation of the device by the user. Its exact position on the instrument may be varied and if a surgical scraper embodying only one scraping and specimen collecting head is employed, then it may be desirable to have only one manipulating portion therefor.

A significant contribution of invention has been the provision of the unique spreader portions so that the test specimen obtained may be immediately spread upon a test slide in one operation to assure accurate detection of cellular irregularities. It should be understood that there may be one or a plurality of spreader portions provided with the device dependent upon the test material to be obtained. They may, of course, have varying depths.

It will thus be seen that I have provided an improved surgical scraper which may be used for the detection of certain diseases, and in particular, for the detection of cancer of the uterus and cervix. For purposes of illustration, a cervical scraper has been depicted and described herein. However, it should be understood that a scraper of the type having utility in obtaining test specimens from other areas of the body, such as the skin, throat, vulva and tongue may be utilized. The important and advantageously disposed spreading device for immediately spreading the test specimen on a test slide significantly contributes to the advantages offered by the invention and the successful and accurate results obtained.

What is claimed is:

1. An improved disposable scraping device of desirable strength and resiliency for collecting test specimens while substantially alleviating the danger of breakage comprising: a rod-shaped body member, first and second scraping and specimen collecting heads disposed at opposite ends of said body member and formed integrally therewith along the longitudinal axis thereof, said first scraping and specimen collecting head having a body portion and a tip portion extending forwardly therefrom, said tip portion having one edge thereof extending contiguously with said body portion to form a continuous arc terminating in a substantially arcuate point and having an opposite edge substantially parallel to the longitudinal axis of the body member, the outside diameter of said tip portion being substantially less than the outside diameter of the body of said head, said second scraping and specimen collecting head having a relatively flat rectangular body portion and at least one projection extending forwardly therefrom.

2. An improved scraping device for collecting test specimens as set forth in claim 1 in which said scraping device is made in one piece from plastic material and in which said first and second scraping and specimen collecting heads are made wettable.

3. An improved disposable cervical scraper of desirable strength and resiliency for collecting cervical cytology specimens while substantially alleviating the danger of breakage comprising: a rod-shaped body member, first and second scraping and specimen collecting heads for collecting cellular materials in the cervical area disposed on opposite ends of said body member and formed integrally therewith along the longitudinal axis thereof, said first scraping and specimen collecting head having a body portion and a tip portion extending forwardly therefrom said tip portion having one edge thereof extending contiguously with said body portion to form a continuous arc terminating in a substantially arcuate point and having an opposite edge substantially parallel to the longitudinal axis of the rod-shaped body member, the outside diameter of said tip portion being substantially less than the outside diameter of the body portion of said tip, said second scraping and specimen collecting head having a body portion being relatively flat and rectangular in form and having at least one tip extending forwardly therefrom, means for manipulating said cervical scraper formed integrally with said body member representing an elongated zone thereon and having a polygonal configuration, and means for immediately spreading said cytology specimen across a supporting surface being formed integrally with said rod-shaped body member having a spreading zone of reduced diameter with respect to said body member and having two annular shoulders disposed at each end of said spreading zone whereby said shoulders are spaced apart so as to rest on a supporting surface so that a substantially uniform layer of cellular material is spread across the supporting surface by engagement of said cellular material with the spreading zone of the spreading means to obtain substantially accurate test slides and facilitate detection of any irregularities present in the specimen.

4. An improved disposable scraping device for collecting test specimens of the type having a rod-shaped body and at least one scraping and specimen collecting head disposed at an end thereof comprising: a rod-shaped body member, manipulating means formed on said rod-shaped body member, spreading means disposed on said body member intermediate the ends thereof, said spreading means being of reduced diameter with respect to the portion of said rod-shaped body member adjacent thereto, a pair of spaced annular shoulders of similar diameter forming the outer extremities of said spreading means, the remaining central portion of said spreading means being of a smaller outer diameter than said annular shoulders so that when said spreading means is placed on a supporting surface, said annular shoulders only will contact said supporting surface so that a substantially uniform layer of test specimen placed upon said supporting surface may be spread across said supporting surface to obtain substantially accurate test specimens and facilitate detection of any irregularities present in the specimen, a pair of raised annular end stops having an outer diameter greater than said spreading means are mounted on said body portion so that the inner surface of each end stop contacts the outer surface of each annular shoulder of said spreading means respectively, and said end stops being spaced apart a distance substantially equal to the diameter of a test slide so that when said spreading means is positioned on a test slide the inner surface of each end stop will contact an opposing side wall of the test slide to facilitate the assurance that only said spreading means contacts the top surface of the test slide.

5. An improved disposable scraping device for collecting test specimens of the type having a rod-shaped body and at least one scraping and specimen collecting head disposed at an end thereof comprising: a rod-shaped body member, manipulating means formed on said rod-shaped body member, spreading means disposed on said body member intermediate the ends thereof, said spreading means being of reduced diameter with respect to the portion of said rod-shaped body member adjacent thereto, a pair of spaced annular shoulders of similar diameter forming the outer extremities of said spreading means, the remaining central portion of said spreading means being of a smaller outer diameter than said annular shoulder so that when said sperading means is placed on a supporting surface, said annular shoulders only will contact said supporting surface so that a substantially uniform layer of test specimen placed upon said supporting surface may be spread across said supporting surface to obtain substantially accurate test specimens and facilitate detection of any irregularities present in the specimen, each of said annular shoulders being provided with at least two laterally extending raised projections, and said projections serving to limit the rotation of movement of the spreading device on the supporting surface to assist in the formation of a uniform layer of test material on said supporting surface.

6. An improved disposable spreading device for uniformly spreading test specimens on a supporting surface, said spreading device comprising: a rod-shaped body member, manipulating means formed on said rod-shaped body member, spreading means disposed on said body member intermediate the ends thereof, said spreading means being of reduced diameter with respect to the portion of said rod-shaped body member adjacent thereto, a pair of spaced annular shoulders of similar diameter forming the outer extremities of said spreading means, the remaining central portion of said spreading means being of a smaller outer diameter than said annular shoulders so that when said spreading means is placed on a supporting surface, said annular shoulders only will contact said supporting surface so that a substantially uniform layer of test specimen placed upon said supporting surface may be spread across said supporting surface to obtain substantially accurate test specimens and facilitate detection of any irregularities present in the specimen, a pair of raised annular end stops having an outer diameter greater than said spreading means being mounted on the body portion so that the inner surface of each end stop contacts the outer surface of each annular shoulder of said spreading means respectively, said end stops being spaced apart a distance substantially equal to the diameter of a test slide so that when said spreading means is positioned on a test slide the inner surface of each end stop will contact an opposing side wall of the test slide to facilitate the assurance that only said spreading means contacts the top surface of the test slide.

7. An improved disposable spreading device for uniformly spreading test specimens on a supporting surface, said spreading device comprising: a rod-shaped body member, manipulating means formed on said rod-shaped body member, spreading means disposed on said body member intermediate the ends thereof, said spreading means being of reduced diameter with respect to the portion of said rod-shaped body member adjacent thereto, a pair of spaced annular shoulders of similar diameter forming the outer extremities of said spreading means, the remaining central portion of said spreading means being of a smaller outer diameter than said annular shoulders so that when said spreading means is placed on a supporting surface, said annular shoulders only will contact said supporting surface so that a substantially uniform layer of test specimen placed upon said supporting surface may be spread across said supporting surface to obtain substantially accurate test specimens and facilitate detection of any irregularities present in the specimen, each of said annular shoulders being provided with at least one laterally extending raised projection in alignment with a similar laterally extending raised projection on the other annular shoulder, and said projection serving to limit the rotation of movement of the spreading device on the supporting surface to assist in the formation of a uniform layer of test material on said supporting surface.

8. The invention in accordance with claim 6 wherein at least two adjacent spreading means are disposed on said body member.

References Cited

UNITED STATES PATENTS

| | | | |
|---|---|---|---|
| 1,669,395 | 5/1928 | Guttman | 128—2 |
| 2,471,088 | 5/1949 | Ayre | 128—304 |
| 2,505,358 | 4/1950 | Gusberg et al. | 128—2 |
| 2,514,665 | 7/1950 | Myller | 128—2 |
| 2,603,809 | 7/1952 | Patton | 15—236 |
| 2,827,039 | 3/1958 | Seiger | 128—2 |
| 3,088,454 | 5/1963 | Shute | 128—2 |
| 3,114,165 | 12/1963 | Koteles et al. | 15—236 |
| 3,315,661 | 4/1967 | Groat | 128—2 |

FOREIGN PATENTS 1,324,126 3/1963 France.

RICHARD A. GAUDET, Primary Examiner

K. L. HOWELL, Assistant Examiner

U.S. Cl. X.R.

15—236; 128—304; 195—127